United States Patent
Fitch et al.

[11] Patent Number: 5,212,126
[45] Date of Patent: May 18, 1993

[54] ALUMINUM RESISTANT REFRACTORY AND METHOD

[75] Inventors: Lawrence D. Fitch; Thomas R. Kleeb, both of Pittsburgh, Pa.

[73] Assignee: Dresser Industries, Inc., Dallas, Tex.

[21] Appl. No.: 712,385

[22] Filed: Jun. 10, 1991

[51] Int. Cl.⁵ ............................................. C04B 35/02
[52] U.S. Cl. .................................... 501/100; 501/101; 501/124; 501/125; 501/127; 106/695; 106/696
[58] Field of Search .................. 106/14.44, 38.22, 695; 501/125, 127, 100

[56] References Cited

U.S. PATENT DOCUMENTS

| | | | |
|---|---|---|---|
| 4,174,230 | 11/1979 | Hashimoto et al. | 106/660 |
| 4,430,439 | 2/1984 | Kleeb | 501/95 |
| 4,510,253 | 4/1985 | Felice et al. | 501/95 |
| 4,806,509 | 2/1989 | Porterfield | 501/127 |
| 4,806,569 | 2/1989 | Porterfield | 501/127 |
| 4,857,489 | 8/1989 | Bearden | 501/95 |
| 4,900,698 | 2/1990 | Lundrager | 501/133 X |

Primary Examiner—Karl Group
Assistant Examiner—Chris Gallo

[57] ABSTRACT

A monolithic refractory with improved resistance to molten aluminum and a method of imparting the resistance by adding 0.2 to 1 wt.% polyvinyl chloride powder to the base mix.

18 Claims, No Drawings

ALUMINUM RESISTANT REFRACTORY AND METHOD

BACKGROUND OF THE INVENTION

This invention relates to refractories for use in the production of molten aluminum and aluminum alloys, and more specifically, it concerns a refractory containing minor additions of a water-insoluble, chlorine-containing material such as polyvinyl chloride (PVC) powder.

The containment of molten aluminum presents a difficult challenge to the refractory specialist. Molten aluminum, especially superheated aluminum, is extremely fluid and corrosive. Common alloying agents, such as magnesium and lithium, enhance the reactive and corrosive power of the alloy. Refractories used to contain aluminum tend to have open porosity. Once molten aluminum penetrates into the refractory, chemical reactions occur between the aluminum, its alloying agents, and the silica-containing phases (or other reducible phases) in the refractory. The products of these reactions, namely silicon and alumina, cause severe problems. Silicon contaminates molten aluminum thereby decreasing its commercial value. Alumina forms a dross buildup which decreases the holding capacity of the furnace and makes heat transfer from the flame to the bath more difficult. In addition, the reactions between the aluminum, its alloying agents and the refractory disrupt the refractory and, thereby, decrease the life of the furnace.

There has been an on-going effort in the refractories industry to provide a more aluminum-resistant refractory. One approach dealt with aluminum orthophosphate bonding of alumino-silicate refractories as a means to decrease molten aluminum penetration. While this type of bonding has provided some improvement, the need exists for a less reactive refractory to contain aluminum. This need has arisen due to the increasingly tighter specifications on silicon and phosphorous levels in the final product. Because of this concern, some aluminum producers have recently excluded the use of phosphate bonded compositions in certain wear-prone areas of aluminum reverberatory furnaces such as sidewalls and bellybands.

Another approach has been the addition of borosilicate frits to calcium aluminate cement-bonded refractories. A disadvantage of the addition of borosilicate frits is that these additions are slightly soluble in water and they have an acidic pH. Their use in low cement castables sometimes prevents the refractory from hardening at room temperature. A further disadvantage of these frits is their lack of refractoriness at elevated temperatures. This causes loss of strength which is a concern since at times aluminum-producing furnaces often experience temperature excursions 1.7 times greater than that needed to melt aluminum.

U.S. Pat. No. 4,806,509 issued to Porterfield on Feb. 21, 1989, discloses yet another approach to providing an aluminum resistant refractory composition. In particular, Porterfield discloses a refractory including a refractory aggregate, a binder, and a synthetic fused aluminum borate additive for imparting aluminum resistance. This additive is a calcium fluoride aluminum borate aggregate with the calcium fluoride dispersed within an insoluble structure provided by the fused aluminum borate. The synthetic additive of Porterfield is produced by blending boric acid, calcined alumina and fluorspor. Although the synthetic additive of Porterfield may provide the refractory with improved resistance to aluminum, at high addition levels the synthetic additive may be detrimental to the physical properties of the refractory and increase the costs of the product containing such a synthetic additive.

U.S. Pat. No. 4,510,253 issued to Felice et al on Apr. 9, 1985, discloses a lightweight refractory composition for use in contact with molten aluminum alloys. This lightweight refractory includes ceramic fibers, binders, and an additive containing $9Al_2O_3 \cdot 2\text{-}B_2O_3$. This additive is preferably aluminum boron slag which is a by-product of the production of ferro-boron. The aluminum boron slag utilized by Felice et al may contain impurities which decrease the refractoriness of products which contain this additive. The slag may also contain compounds which retard set times and destroy hydraulic bonding.

In light of the foregoing, the need clearly exists for a refractory that contains an aluminum penetration inhibitor which is compatible in acid-bonded systems, cement-bonded systems, is not water soluble, does not adversely affect hot strength, and is relatively inexpensive to produce.

SUMMARY OF THE INVENTION

In accordance with the present invention, the aforementioned disadvantages have been unexpectedly remedied by a minor addition of a water-insoluble, chlorine-containing powder to an otherwise conventional refractory mix. Specifically, it has been found that additions of 0.2 to 1 wt.% polyvinyl chloride (PVC) powder is effective in decreasing the penetration and subsequent reaction of molten aluminum in cement-bonded 60% alumina and cement-bonded 70% alumina castables. It is contemplated that this additive would also be useful in decreasing the penetration of molten aluminum in other conventional refractory monoliths used to line aluminum furnaces, such as phosphate-bonded monoliths and lime-free monoliths. It is also expected that other aggregates such as fused or sintered alumina, fused or sintered magnesium aluminate spinel, and fused or sintered bauxite or chrome ore could be used in castables containing this additive with at least equal success.

Accordingly, a principal object of the present invention is to provide a refractory that is suited for use in molten aluminum and aluminum alloy contact applications. Another and more specific object of the invention is the provision of a refractory which is resistant to penetration and reaction by molten aluminum and aluminum alloys. Yet still another object of the present invention is to provide a method of converting a conventional refractory to an aluminum resistant refractory by the addition of a small amount of a water-insoluble, chlorine-containing material such as vinyl chloride or polyvinyl chloride (PVC) powder. Other objects and further scope of applicability of the present invention will become apparent from the detailed description to follow taken in conjunction with the accompanying tables.

DETAILED DESCRIPTION OF THE PREFERRED EMBODIMENT

In accordance with the present invention, the aluminum resistance of conventional refractory plastics, mortars, ramming mixes, and concretes is dramatically improved by the addition of a relatively small amount of a water-insoluble, chlorine-containing material, such as vinyl chloride powder or polyvinyl chloride (PVC) powder.

Examples of refractory mixes containing additions of PVC in accordance with the present invention are shown in Tables I and II. PVC powders were evaluated from two suppliers. A typical commercial grade, for example, would be Dow Chemical's F-239 PVC. Under molten aluminum test conditions, shapes containing the minor PVC additions did not show any metal penetration and had very weak adherence of aluminum to the surface of the refractory. This was a significant improvement compared to the standard which showed some metal penetration and strong adherence. Testing of the aluminum after prolonged contact with the refractory showed that there was negligible pickup of contaminants, such as silicon and iron.

In a 60% alumina castable with less cement than the 70% alumina castable, the presence of minor additions of PVC powder did not cause a decrease in water requirement to achieve a casting consistency. In this series, somewhat decreased metal penetration was seen and the degree of adherence was lessened. Only Mix H showed minimal pickup of the contaminating elements (silicon and iron) in the residual metal in contact with the test shape.

Mixes F and L were cast into shapes which were reheated to 2000° F. This was done to test the stability of the PVC addition at elevated temperatures. Results of the aluminum cup test indicated that the shapes reheated to 2000° F. performed as well as those which were only cured at 250° F.

TABLE I

| Addition of PVC Powder to a Cement Bonded 70% Alumina Castable | | | | | | | |
|---|---|---|---|---|---|---|---|
| Mix: | A | B | C | D | E | F | |
| 70% Alumina Calcines 3/10 mesh | | | | 37% | | | |
| 70% Alumina Calcines 10/28 | | | | 17 | | | |
| 70% Alumina Calcines 28/65 | | | | 9.5 | | | |
| 70% Alumina Calcines Fines 50% −325 mesh | | | | 24 | | | |
| Calcium Aluminate Cement (80% Al$_2$O$_3$) | | | | 12.5 | | | |
| Plus Additions* | | | | | | | |
| Type 1 PVC - Supplier A | — | 0.2% | — | — | — | 0.2% | |
| Type 2 PVC - Supplier A | — | — | 0.2% | — | — | — | |
| Type 3 PVC - Supplier B | — | — | — | 0.2% | — | — | |
| Type 4 PVC - Supplier B | — | — | — | — | 0.2% | — | |
| Water | 9 | 7.6 | 7.1 | 7.3 | 7.1 | 7.6 | |
| Heat Treatment After Casting Shapes: | | Dried at 250° F. | | | | 2000° F. Reheat | |
| ALCOA 72 Hour Aluminum Cup Test at 1500° F. Using 7075 Alloy | | | | | | | |
| Metal Penetration, in.: | 2/32–4/32 | None | None | None | None | None | |
| Metal Adherence: | Strong | Weak | Weak | Weak | Weak | Weak | |
| Metal Pick-up in Aluminum Bath From Refractory | | | | | | | Specification |
| % Silicon (Si): | — | +0.05 | +0.05 | +0.02 | +0.02 | — | +0.5 max. |
| % Iron (Fe): | — | +0.04 | 0.00 | −0.01 | +0.01 | — | +0.1 max. |
| % Magnesium (Mg): | — | −1.47 | −0.37 | −0.23 | −0.57 | — | — |

*Type 1 PVC Powder contains about 64 wt. % chloride and 28 wt. % total carbon
Type 2 PVC Powder contains about 54 wt. % chloride and 31 wt. % total carbon
Type 3 PVC Powder contains about 56 wt. % chloride and 38 wt. % total carbon
Type 4 PVC Powder contains about 55 wt. % chloride and 39 wt. % total carbon

TABLE II

| Addition of PVC Powder to a Cement Bonded 60% Alumina Castable | | | | | | | |
|---|---|---|---|---|---|---|---|
| Mix: | G | H | I | J | K | L | |
| 60% Alumina Calcines 3/10 mesh | | | | 40% | | | |
| 60% Alumina Calcines 10/28 | | | | 15 | | | |
| 60% Alumina Calcines 28/65 | | | | 10 | | | |
| 60% Alumina Calcines Fines 50% −325 | | | | 23 | | | |
| Submicron Silica | | | | 3 | | | |
| Calcium Aluminate Cement (70% Alumina | | | | 9 | | | |
| Plus Additions | | | | | | | |
| Dry Phosphate Additive* | | | | 0.2 | | | |
| Type 1 PVC Powder | — | 0.2 | — | — | — | 0.2 | |
| Type 2 PVC Powder | — | — | 0.2 | — | — | — | |
| Type 3 PVC Powder | — | — | — | 0.2 | — | — | |
| Type 4 PVC Powder | — | — | — | — | 0.2 | — | |
| Water | 6 | 6 | 6 | 6 | 6 | 6 | |
| Heat Treatment After Casting Shapes: | | Dried at 250° F. | | | | 2000° F. Reheat | |
| ALCOA 72 Hour Aluminum Cup Test at 1500° F. Using 7075 Alloy | | | | | | | |
| Metal Penetration, in.: | 6/32–10/32 | 0–6/32 | 0–12/32 | 0–12/32 | 0–12/32 | 0–3/32 | |
| Metal Adherence: | Strong | Weak | Weak | Weak | Weak | Strong | |
| Metal Pick-up in Aluminum Bath From Refractory | | | | | | | Specification |
| % Silicon (Si): | >+2.0 | +0.36 | +1.29 | +1.27 | +1.77 | +1.14 | +0.5 max. |
| % Iron (Fe): | +0.12 | +0.03 | +0.03 | +0.03 | +0.04 | +0.01 | +0.1 max. |

TABLE II-continued

| | Addition of PVC Powder to a Cement Bonded 60% Alumina Castable | | | | | |
|---|---|---|---|---|---|---|
| Mix: | G | H | I | J | K | L |
| % Magnesium (Mg): | −1.21 | −0.19 | −1.04 | −0.74 | −1.01 | −0.7 | — |

*Ercophos, made by Erco Industries Ltd., Islington, Ontario, Canada.

Tables III and IV show the results of PVC powder addition in the range of 0.2 to 3% in cement-bonded 60% and 70% alumina castables. It was revealed that mixes which contained the PVC addition were still useful after exposure to hot, humid conditions for two months. This is often a concern as many refractory monoliths are sold as blended, dry aggregates and binders and often are in storage under adverse conditions for extended periods before use. The PVC-containing mixes could be cast into shapes after prolonged storage and acceptable properties achieved.

The hot strength of cement-bonded 60% alumina mixes containing PVC powder was slightly lower than mixes without the addition. The hot strength of cement-bonded 70% alumina mixes containing PVC powder was slightly higher.

TABLE III

| | Mixes Containing Various Levels of PVC Powder | | | | | |
|---|---|---|---|---|---|---|
| Mix: | A | B | C | D | E | F |
| 70% Alumina Calcines, 3/10 mesh | 37% | — | — | — | — | — |
| 70% Alumina Calcines, 10/28 | 18 | — | — | — | — | — |
| 70% Alumina Calcines, 28/65 | 10.5 | — | — | — | — | — |
| 70% Alumina Calcines Fines 72% −325 | 22 | — | — | — | — | — |
| 60% Alumina Calcines, 3/10 mesh | — | 40% | | | | |
| 60% Alumina Calcines, 10/28 | — | | | 15 | | |
| 60% Alumina Calcines, 28/65 | — | | | 10 | | |
| 60% Alumina Calcines Fines 52% −325 | — | | | 23 | | |
| Calcium Aluminate Cement (80% Al₂O₃) | 12.5 | — | — | — | — | — |
| Calcium Aluminate Cement (70% Al₂O₃) | — | | | 9 | | |
| Sub-Micron Silica | — | | | 3 | | |
| Plus Additions: | | | | | | |
| Dry Phosphate Additive* | — | 0.2 | 0.2 | 0.2 | 0.2 | 0.2 |
| Type 1 PVC Powder | 0.2 | 0.2 | 1.0 | 0.05 | 0.2 | 3.0 |
| Water | 7.5 | 6.0 | 6.0 | 6.0 | 6.0 | 7.6 |

*Ercophos, made by Erco Industries Ltd., Islington, Ontario, Canada.

TABLE IV

| Hot Strength and Storage Tests on Mixes from Table III | | | | | |
|---|---|---|---|---|---|
| Mix: | A | | B | | E |
| Heat Treatment, °F.: | 250 | 2000 | 250 | 2000 | 250 |
| % Water for Casting: | 7.5 | | 6 | | |
| Casting Characteristics: | | | Good | | |
| Bulk Density, pcf | | | | | |
| After Drying at 250° F.: | 152 | — | 151 | — | 148 |
| After 2000° F. Reheat | — | 147 | — | 146 | — |
| Apparent Porosity, % | | | | | |
| After Drying at 250° F.: | — | — | — | — | 14.2 |
| Cold Crushing Strength, psi | | | | | |
| After Drying at 250° F.: | — | — | — | — | 10,460 |
| After Storing 1 Month At 110° F., 95% Relative Humidity | | | | | |
| % Water for Casting: | — | — | — | — | 6.5 |
| Casting Characteristics: | — | — | — | — | Good |
| After Drying at 250° F. | | | | | |
| Bulk Density, pcf: | — | — | — | — | 149 |
| Cold Crushing Strength, psi: | — | — | — | — | 8690 |
| Apparent Porosity, %: | — | — | — | — | 11.4 |
| After Storing 2 Months At 110° F., 95% Relative Humidity | | | | | |
| % Water for Casting: | — | — | — | — | 6.7 |
| Casting Characteristics: | — | — | — | — | Fair |
| After Drying at 250° F. | | | | | |
| Bulk Density, pcf: | — | — | — | — | 147 |
| Cold Crushing Strength, psi: | — | — | — | — | 5750 |
| Apparent Porosity, %: | — | — | — | — | 16.7 |

| | A | | | B | | |
|---|---|---|---|---|---|---|
| Mix: | After Drying | Standard w/o PVC | After 2000° F. Reheat | After Drying | Standard w/o PVC | After 2000° F. Reheat |
| Modulus of Rupture, psi | | | | | | |
| At 1500° F.: | 890 | 440–650 | 390 | 1840 | 2090–2380 | 1590 |
| At 2000° F.: | 410 | 480 | 330 | 1500 | 1700–1820 | 1340 |

Based upon the aluminum cup test (Table V), the preferred range of PVC additions is 0.2 to 1.0%. Below and above this range, metal penetration was increased.

TABLE V

| Aluminum Reaction Tests From Table III | | | |
|---|---|---|---|
| Mix: | C | D | F |
| | Cement Bonded 60% Alumina Castable | | |
| % PVC Addition: | 1.0 | 0.05 | 3.0 |

TABLE V-continued

| Aluminum Reaction Tests From Table III | | | |
|---|---|---|---|
| Mix: | C | D | F |
| Heat Treatment: ALCOA 72 Hour Aluminum Cup Test At 1500° F. Using 7075 Alloy | Dried at 250° F. | | |
| Aluminum Penetration, in.: | 0–1/16 | 0–6/16 | 0–8/16 |
| Aluminum Adherence: | Weak | Moderate | Weak |
| Change in Metal Chemistry | | | Specification |
| % Silicon (Si): | +0.08 | +1.13 | +0.04 | +0.5 max. |
| % Iron (Fe): | 0.00 | +0.05 | +0.01 | +0.1 max. |
| % Magnesium (Mg): | −0.60 | −0.77 | −1.71 | |

Thus, it will be appreciated that, as a result of the present invention, a highly effective aluminum resistant refractory and method is provided by which the principal object and others are completely fulfilled. It is contemplated and will be apparent to those skilled in the art from the foregoing description and accompanying tables that variations and/or modifications of the disclosed embodiment may be made without departure from the invention. Accordingly, it is expressly intended that the foregoing description and accompanying tables are illustrative of a preferred embodiment only, not limiting, and that the true spirit and scope of the present invention be determined by reference to the appended claims.

What is claimed is:

1. In a refractory mix, the improvement comprising the addition of 0.2 to 1 wt.% polyvinyl chloride powder.

2. The refractory mix of claim 1, wherein said refractory is used for the containment of molten aluminum.

3. In a refractory monolithic shape, the improvement comprising the addition of 0.2 to 1 wt.% polyvinyl chloride powder.

4. The refractory monolithic shape of claim 3, wherein said shape is used for the containment of molten aluminum.

5. In a method of producing a refractory, the improvement comprising:
adding 0.2 to 1 wt.% polyvinyl chloride powder.

6. A method of increasing the aluminum resistance of a refractory, comprising the step of:
adding a small amount of a water-insoluble, chlorine-containing powder to the mix.

7. The method of claim 6, wherein said powder is polyvinyl chloride powder.

8. The method of claim 7, wherein said powder is in an amount of about 0.2 to 1 wt.% of the mix.

9. An aluminum resistant cement-bonded alumina castable consisting essentially of alumina calcines, calcium aluminate cement, and an amount less than 1 wt.% polyvinyl chloride powder.

10. The castable of claim 9, wherein said powder is an addition of about 0.2 to 1 wt.%.

11. The castable of claim 10, wherein said alumina calcines is 70 wt.%.

12. An aluminum resistant castable consisting essentially of alumina calcines, submicron silica, calcium aluminate cement, less than 1 wt.% dry phosphate additive, and an amount less than 1 wt.% polyvinyl chloride powder.

13. The castable of claim 12, wherein said powder is an addition of about 0.2 to 1 wt.%.

14. The castable of claim 13, wherein said alumina calcines is 60 wt.%.

15. A process of producing an aluminum resistant refractory shape comprising the steps of:
mixing alumina calcines, calcium aluminate cement, an amount less than 1 wt.% polyvinyl chloride powder and water as required to form a castable mixture,
casting a shape from said mixture, and
heat treating said cast shape.

16. A process of producing an aluminum resistant refractory shape comprising the steps of:
mixing alumina calcines, calcium aluminate cement, submicron silica, less than 1 wt.% dry phosphate additive, an amount less than 1 wt.% polyvinyl chloride powder and water as required to form a castable mixture,
casting a shape from said mixture, and
heat treating said cast shape.

17. In a refractory composition, the improvement comprising the addition of 0.2 to 1 wt.% polyvinyl chloride powder.

18. The refractory composition of claim 17, wherein said refractory is used for the containment of molten aluminum.

* * * * *